United States Patent [19]

Suzuki et al.

[11] Patent Number: 5,633,763
[45] Date of Patent: May 27, 1997

[54] LENS DRIVE MECHANISM USING AN ELECTRO-MECHANICAL TRANSDUCER

[75] Inventors: Shinichi Suzuki, Izumiootsu; Tetsuro Kanbara, Sakai; Minoru Kuwana, Osaka; Hitoshi Hagimori, Nara-Ken; Junji Hashimura, Sakai, all of Japan

[73] Assignee: Minolta Co., Ltd., Osaka, Japan

[21] Appl. No.: 499,002

[22] Filed: Jul. 6, 1995

[30] Foreign Application Priority Data

Jul. 8, 1994 [JP] Japan .................... 6-179741

[51] Int. Cl.$^6$ .................... G02B 7/02
[52] U.S. Cl. .................... 359/822; 359/824; 359/826; 359/601
[58] Field of Search .................... 359/822, 823, 359/824, 826, 817, 601, 696

[56] References Cited

U.S. PATENT DOCUMENTS

| 4,195,243 | 3/1980 | Thaxter . | |
| 4,607,913 | 8/1986 | Jansen ................... | 359/822 |
| 4,894,579 | 1/1990 | Higuchi et al. . | |
| 4,912,493 | 3/1990 | Tanaka . | |
| 5,225,941 | 7/1993 | Saito et al. ................... | 359/824 |
| 5,272,567 | 12/1993 | Inoue ................... | 359/824 |
| 5,365,373 | 11/1994 | Tanaka ................... | 359/601 |
| 5,406,417 | 4/1995 | Denvenyi ................... | 359/823 |

FOREIGN PATENT DOCUMENTS 4-17584  4/1922  Japan .

*Primary Examiner*—Loha Ben
*Attorney, Agent, or Firm*—Burns, Doane, Swecker & Mathis, LLP

[57] ABSTRACT

An apparatus for driving a collapsible lens mount having several telescoping segments includes, for each movable segment, a transducer that expands and contracts responsive to a wave pulse and a drive shaft coupled to the transducer. By varying the wave pulse conditions, the expansion and contraction are made to occur at different rates. A coupling member on each segment frictionally engages the drive shaft and transmits movement of the drive shaft during relatively slow drive shaft movements to the lens segment. The apparatus may also include a lens hood driven by the transducer and drive shaft apparatus of the invention.

10 Claims, 10 Drawing Sheets

LENS DRIVE MECHANISM USING AN ELECTRO-MECHANICAL TRANSDUCER

BACKGROUND OF THE INVENTION

1. Field of the Invention

The present invention pertains to a drive mechanism for a lens member in which an electro-mechanical transducer is used.

2. Description of the Related Art

In a lens requiring a long lens mount, such as a phototaking lens having a long focal length, a collapsible lens mount comprising multiple mount parts, which is collapsed when not in use and which is extended when it is used, may be used.

In a zoom lens system in which the focal length may vary, the construction is such that some of the multiple optical elements (lens units) comprising the entire lens system are moved along the optical axis, so that the focal length changes.

In such a zoom lens system, moreover, because the angle of view changes in response to the focal length, an extendable hood may be used, the position of which along the optical axis may be changed in accordance with the change in the angle of view.

Multiple complex cam mechanisms have been in use to drive said conventional collapsible mount, the optical elements of the zoom lens system, the lens hood, etc. As a consequence, the size of the camera becomes large, and cost disadvantages exist as well. In addition, while multiple cam mechanisms are used to drive optical elements comprising a zoom lens system, some of the optical elements require a minute change in position. However, it has been difficult to achieve these minute changes in position with sufficient precision using cam mechanisms.

Therefore, an efficient drive means has been sought which does not require a large amount of space for the drive of the lens system components such as the lens mount, optical elements and lens hood, and which is capable of freely carrying out minute as well as large changes in the positions of the optical elements.

The phrase 'lens members' refers to various members including lens mounts which directly support the lenses, lens mounts which indirectly support the lenses, and lens hoods, as well as the lenses themselves. The lens assembly comprising these lens members is called the 'lens system'.

SUMMARY OF THE INVENTION

An object of the present invention is to provide a drive mechanism which resolves the aforementioned problems.

Another object of the present invention is to provide a drive mechanism which can be incorporated in a lens system without the lens system becoming large in size. More specifically, using the present invention, compact mechanisms for driving of the various lens members are incorporated in a lens system, which produces a lens system of relatively compact size.

Yet another object of the present invention is to provide a drive mechanism which can easily carry out minute changes in position of a lens member that are difficult to achieve using mechanical means such as cams.

Yet another object of the present invention is to efficiently and optimally move lens members by a mechanical moving means employing cams or drive mechanisms that is capable of achieving minute changes in position depending on what is to be moved.

Yet another object of the present invention is to provide a drive mechanism in which an electro-mechanical transducer is used for the movement of a shield member to prevent the entrance of unnecessary light.

These and other objects or features of the present invention will become apparent from the following description of the preferred embodiments thereof taken in conjunction with the accompanying drawings.

BRIEF DESCRIPTION OF THE DRAWINGS

In the following description, like parts are designated by like reference numbers throughout the several drawings.

DETAILED DESCRIPTION

Preferred embodiments of the present invention are described below to illustrate the invention. The invention is not limited to the described embodiments, and those knowledgeable in the art will understand that variations, changes and equivalents may be made without departing from the scope of the invention.

First Embodiment

A first embodiment illustrates an example in which the present invention is applied in a collapsible lens mount.

Figure 1:
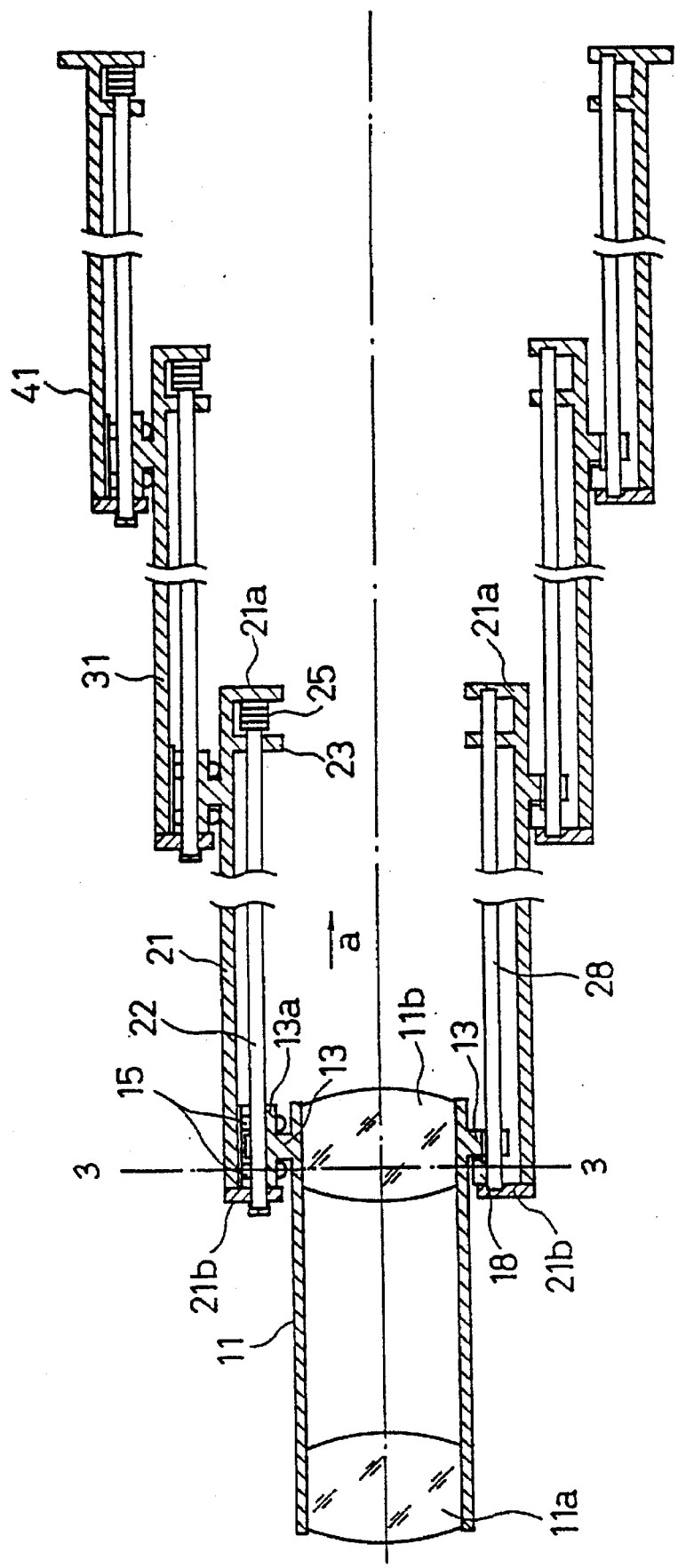
FIG. 1 is a cross-sectional view showing the construction of a collapsible lens mount of a first embodiment in which the present invention is applied.

FIG. 1 is a cross-sectional view of a collapsible lens mount. As indicated in the figure, a first lens mount 11 supports lenses 11a and 11b. A second lens mount 21 houses the first lens mount 11, a third lens mount 31 houses the second lens mount 21, and a fourth lens mount 41 houses the third lens mount 31. Each lens mount is located coaxially and the construction of the lens mounts is such that a lens mount having a smaller diameter can move along the optical axis inside another lens mount that is adjacent to it and has a larger diameter. Each lens mount is equipped with means to shield out unwanted light.

Figure 2:
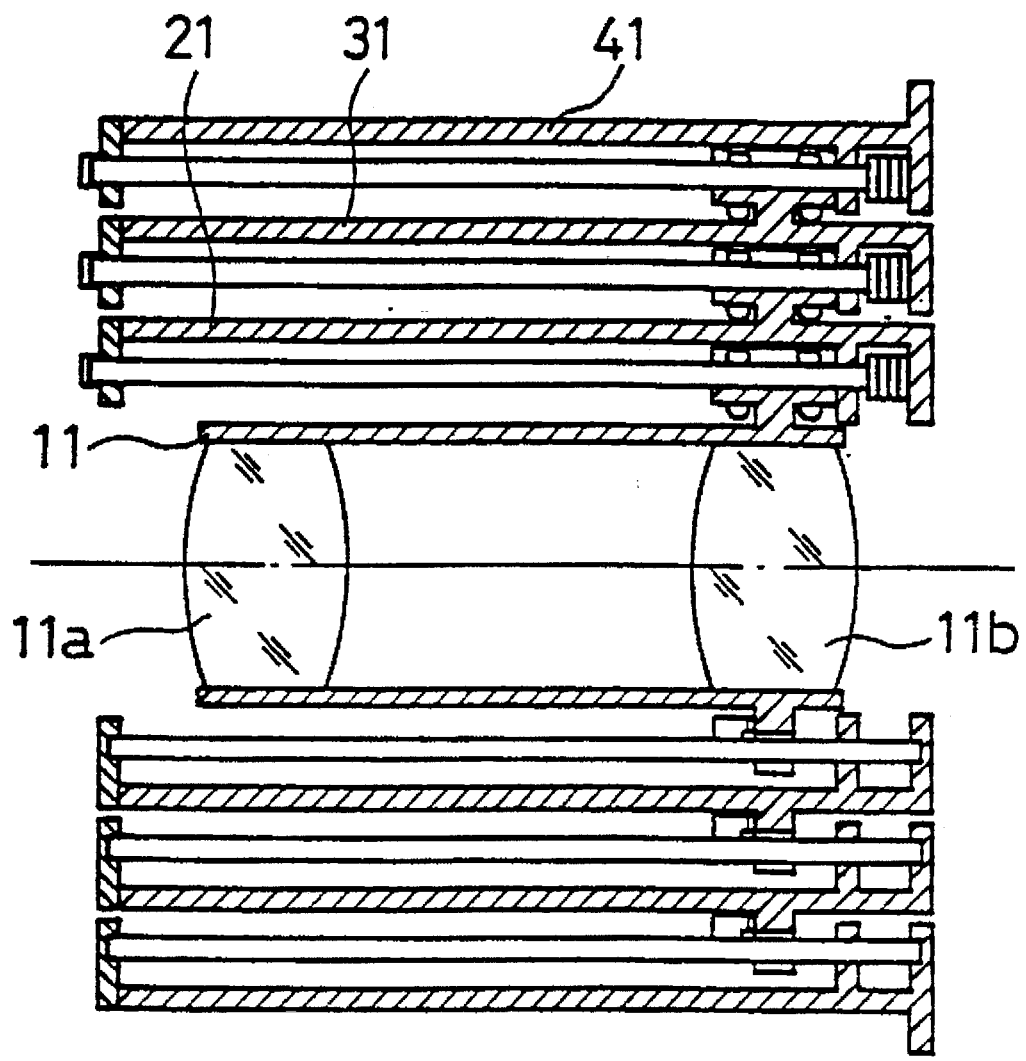
FIG. 2 is a cross-sectional view showing the collapsible lens mount shown in FIG. 1, said lens mount being collapsed.

FIG. 1 shows a situation in which each lens mount is fully extended. If third lens mount 31 is housed in fourth lens mount 41, second lens mount 21 is housed in third lens mount 31 and first lens mount 11 is housed in second lens mount 21, the situation shown in FIG. 2 is present, in which the length of the entire lens mount is the shortest. A lens mount having a construction in which a lens mount having a smaller diameter is housed in another lens mount that is adjacent to it and has a larger diameter, as described above, is called a 'collapsible lens mount'.

The drive mechanisms for the lens mounts are explained below. Because the drive mechanism to move first lens mount 11 inside second lens mount 21, the drive mechanism to drive second lens mount 21 inside third lens mount 31 and the drive mechanism to move third lens mount 31 inside fourth lens mount 41 are all identical, only the drive mechanism to drive first lens mount 11 inside second lens mount 21 is explained here.

Referring again to FIG. 1, a bearing 23 and a drive shaft 22 are supported by collar 21b at one end of second lens mount 21. The bearing 23 and drive shaft 22 are located in second lens mount 21 so that said drive shaft can move along the optical axis. The end of drive shaft 22 on the side of bearing 23 is fixed by suitable means such as gluing to piezoelectric element 25 which has varying thickness along the optical axis. Piezoelectric element 25 is fixed to collar 21a at one end of second lens mount 21.

Guide shaft 28 is located opposite drive shaft 22 in second lens mount 21 and is supported by collars 21a and 21b. Guide shaft 28 is a fixed shaft, which allows first lens mount 11 to move relative to second lens mount 21 along the optical axis but prohibits its rotation.

Figure 3:
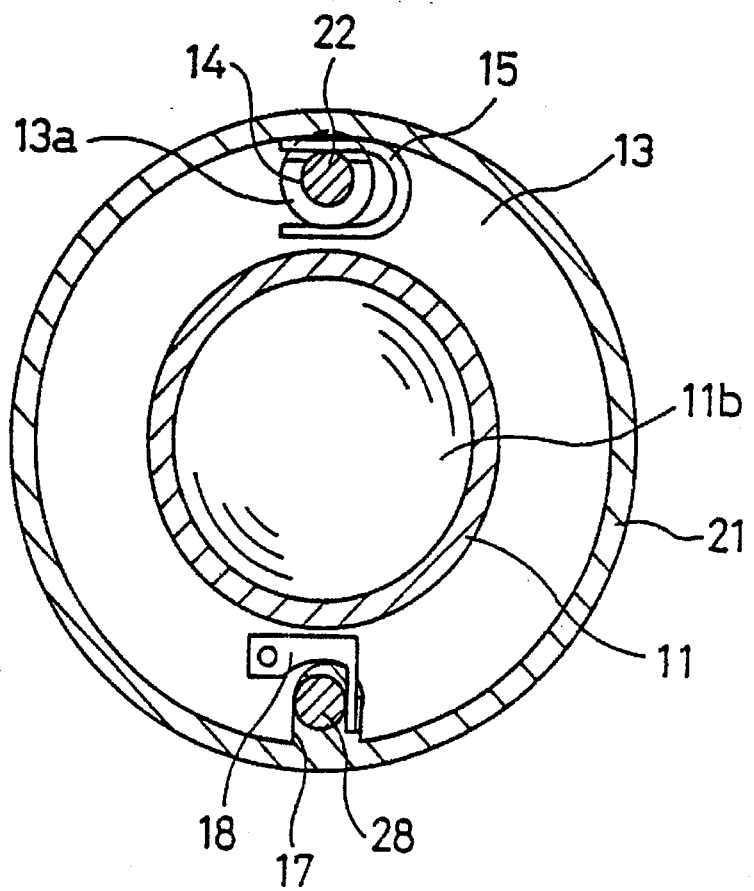
FIG. 3 is a cross-sectional view along the line 3—3 of the collapsible lens mount shown in FIG. 1.

On the other hand, flange 13 is located outside one end of first lens mount 11. Said drive shaft 22 and guide shaft 28 extend through flange 13. FIG. 3 is a cross-sectional view along the line 3—3 in FIG. 1, showing flange 13 and the areas where drive shaft 22 and guide shaft 28 extend through the flange 13.

Drive shaft 22 extends through a hole 14 located on collar 13a of flange 13. Collar 13a and drive shaft 22 are connected with each other via friction generated by appropriate pressure applied by U-shaped spring 15. The guide shaft 28 extends through notch 17 located on flange 13. L-shaped spring 18 located on flange 13 and notch 17 prohibits first lens mount 11 from rotating around the optical axis by sandwiching guide shaft 28 with appropriate pressure.

The drive operation to move the lens mount along the optical axis will now be explained. A case in which first lens mount 11 is moved relative to second lens mount 21 from the extended positions shown in FIG. 1 to the housed position inside second lens mount 21, is explained as an example.

Figure 4:
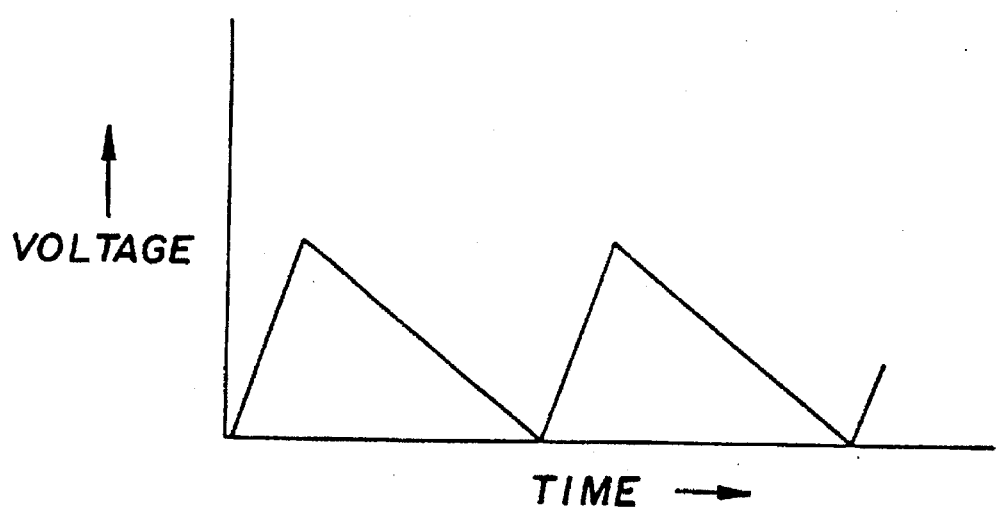
FIG. 4 is a wave form chart showing one example of waves of drive pulses impressed on a piezoelectric element.

Drive pulses, each of which comprises a wave of a steep upslope and a gentle downslope following said upslope as shown in FIG. 4, are impressed to piezoelectric element 25. In response, piezoelectric element 25 rapidly expands in terms of thickness during the steep upslope of the drive pulse. The expansion causes the drive shaft 22 to execute a rapid movement along the optical axis in the direction opposite the direction of arrow a.

When this happens, although the flange 13 of first lens mount 11 is connected to drive shaft 22 via friction by means of collar 13a, the inertia of first lens mount 11 and flange 13 overcomes the friction between flange 13 and drive shaft 22, and the first lens mount 11 and flange 13 remain virtually motionless, such that first lens mount 11 does not move.

On the other hand, during the gentle downslope of the drive pulse, piezoelectric element 25 slowly shrinks in terms of thickness and drive shaft 22 executes a relatively slow movement in the direction of arrow a along the optical axis. When this happens, because collar 13a located on flange 13 of first lens mount 11 is connected to drive shaft 22 via friction, first lens mount 11 virtually moves with drive shaft 22 in the direction of arrow a.

'Virtually' here includes a case in which flange 13 of first lens mount 11 follows the movement of drive shaft 22 while lagging behind due to slipping and moves in either the direction of arrow a or the opposite direction, all of said members as a whole moving in the direction of arrow a based on the difference in drive time. The nature of the movement is determined by the friction conditions present at the time.

By continuously impressing a series of said wave drive pulses to piezoelectric element 25, first lens mount 11 can be continuously moved in the direction of arrow a so that it reaches the housed position inside second lens mount 21.

Conversely, moving first lens mount 11 from the housed position to the extended position can be achieved by impressing a series of drive pulses each comprising a wave of a gentle upslope followed by a steep downslope to piezoelectric element 25.

When second lens mount 21 is moved inside third lens mount 31 or when third lens mount 31 is moved inside fourth lens mount 41, the operation is exactly the same as in said case where first lens mount 11 is moved inside second lens mount 21. In addition, first lens mount 11, second lens mount 21 and third lens mount 31 may be moved simultaneously if necessary.

Second Embodiment

A second embodiment of the present invention will be explained below. The second embodiment is an example in which the present invention is applied in the driving of a lens hood and lens elements of a zoom lens system.

a. Lens Hood in the Zoom Lens System

A problem with a lens hood used in a zoom lens system will first be explained.

In a conventional zoom lens system, because the range of available focal lengths is limited and the difference between the angle of view in the longest focal length condition and that in the shortest focal length condition is not very large, even if the lens hood's diameter and length along the optical axis are set such that stray light entering in the range of available focal lengths may be prevented from entering, the lens hood's diameter does not become extremely large relative to the diameter and thickness of the entire lens system.

Figure 5:
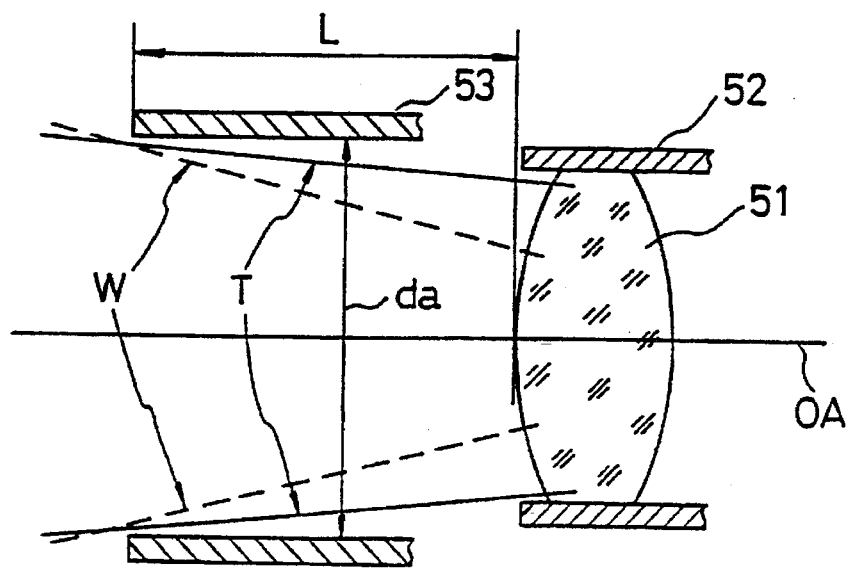
FIG. 5 is a schematic of the relationship between the angle of view of a zoom lens system and a lens hood.

FIG. 5 shows the relationship between the angles of view and the outer diameter of the lens hood in the conventional zoom lens system: 51 is a lens, 52 is a lens mount and 53 is a lens hood. T indicates incident light in the longest focal length condition while w indicates incident light in the shortest focal length condition. As is apparent from this drawing, because the difference between the angle of view in the longest focal length condition and that in the shortest focal length condition is not very large in the conventional zoom lens system, if a lens hood having diameter da is located so that its tip is spaced a distance L from the surface of the lens, stray light may be shielded in both longest and shortest focal length conditions.

On the other hand, the range of available focal lengths has widened and the difference between the angle of view in the longest focal length condition and that in the shortest focal length condition has increased in recent zoom lens systems. Because of this, if the lens hood's diameter and position along the optical axis are set such that stray light that enters in the range of available focal lengths is shielded, the lens hood's diameter becomes extremely large relative to the diameter of the lens.

Figure 6:
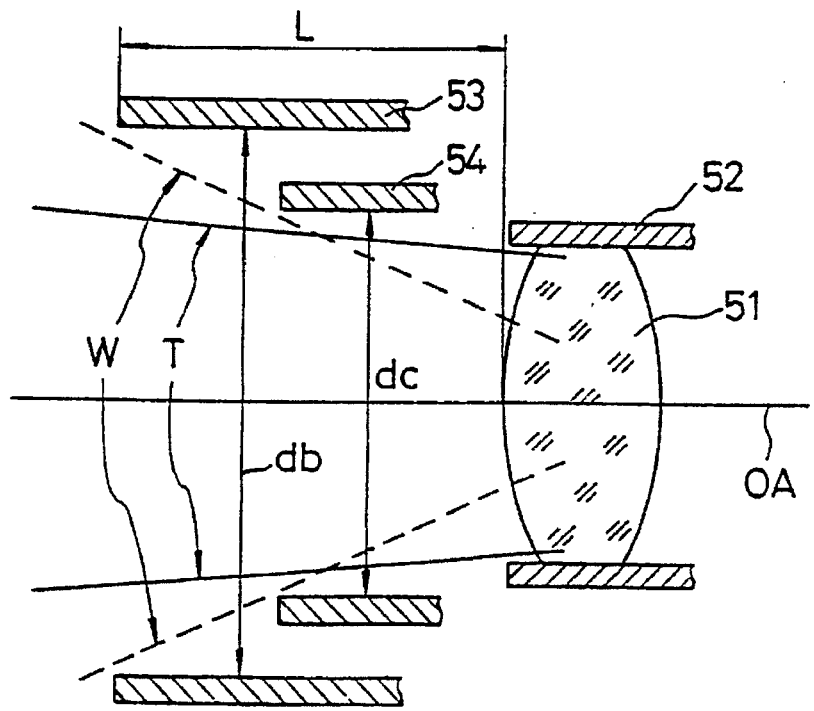
FIG. 6 is a schematic of the relationship between the angle of view of a conventional zoom lens system and the lens hood.

FIG. 6 shows the relationship between the angles of view in a zoom lens system having a wide range of available focal lengths and the diameter of the lens hood. As is apparent from FIG. 6, if the diameter of the lens hood is set based on the angle of view for the incident light in the shortest focal length condition w, the lens hood will look like the one indicated by number 53, in which its diameter db becomes extremely large relative to the diameter of lens 51. As a result, a lens hood having diameter dc indicated by number 54 is employed in practice. However, with lens hood 54, its tip cannot be maintained at distance L from the lens surface, and it is not adequate in shielding stray light vis-a-vis the incident light in the longest focal length condition in particular.

Figure 7:
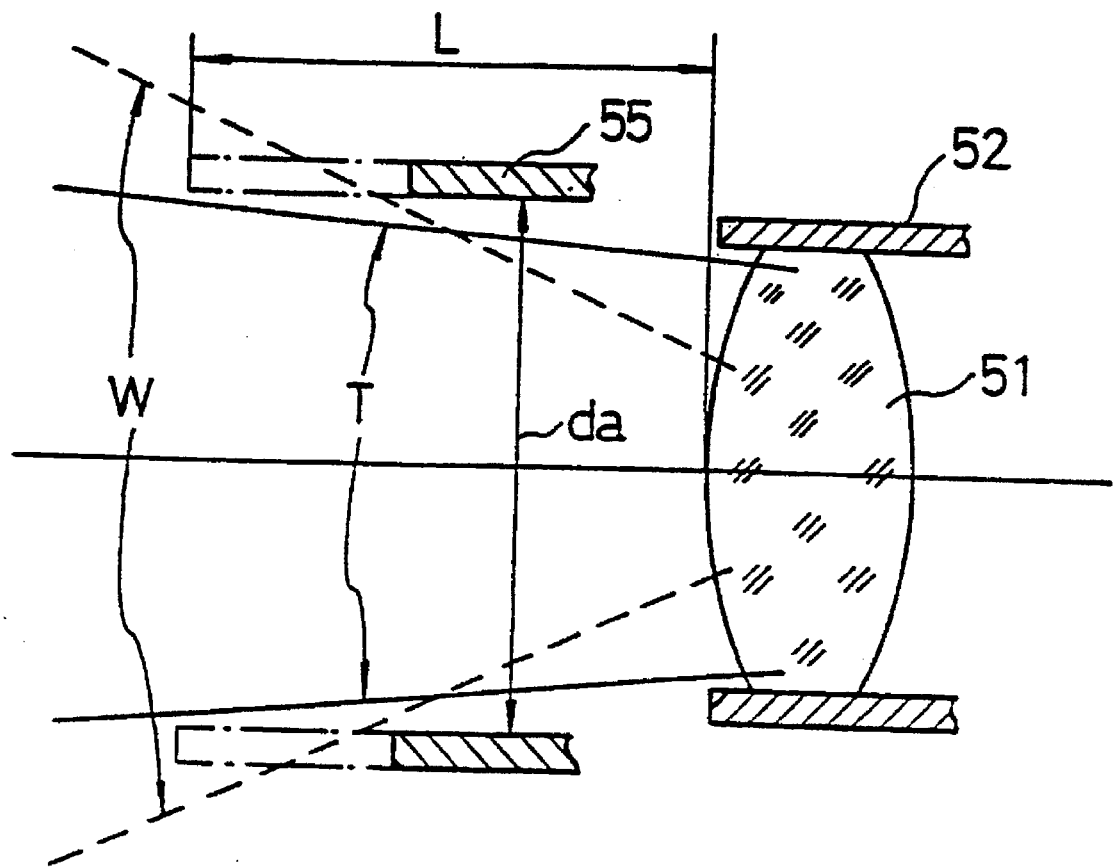
FIG. 7 is a schematic of the relationship between the angle of view of a zoom lens system having a wide range of available focal lengths and an extendable lens hood.

To deal with said problem, hoods extendable along the optical axis have been proposed. FIG. 7 shows the relationship between the angles of view in a zoom lens system having a wide range of available focal lengths and the diameter of an extendable hood. When the lens focal length is set at the shortest length, lens hood 55 is collapsed along the optical axis such that it is set at the position shown by the solid line in FIG. 7, and when the lens focal length is set at the longest length, lens hood 55 is extended along the optical axis such that it is set at the position indicated by the dashed/dotted line in FIG. 7. In this way, stray light may be shielded in both the shortest and longest focal length conditions without obstructing the incident light.

b. Construction of the Entire System

Figure 8:
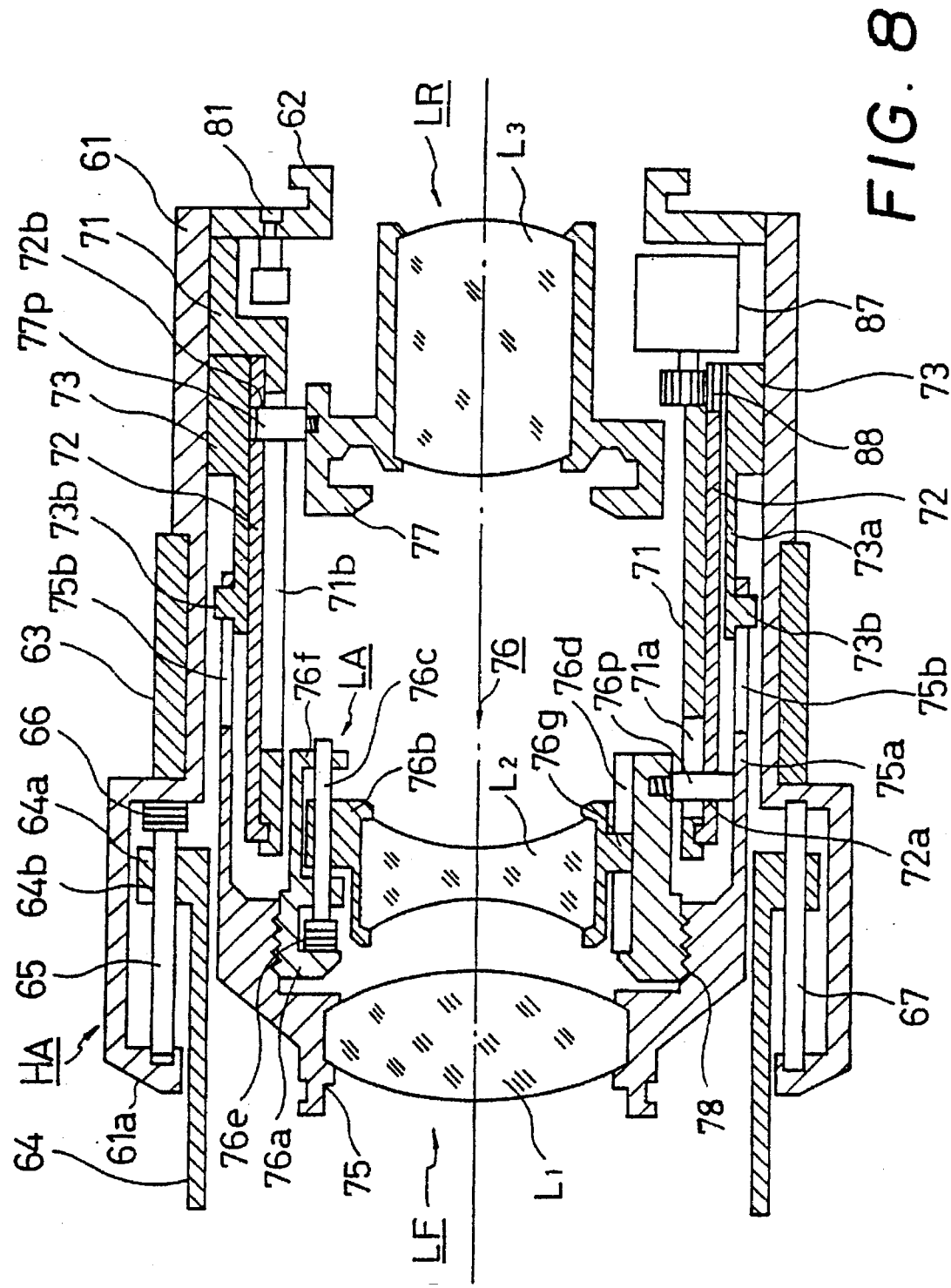
FIG. 8 is a cross-sectional view showing the construction of a zoom lens system of a second embodiment in which the present invention is applied.

FIG. 8 shows a cross-sectional view of the zoom lens system of the second embodiment. The zoom lens system includes an outer shell 61 of the zoom lens system, a mounting unit 62 used to mount the zoom lens system to the camera main unit, and a zooming operation ring 63 which rotates over outer shell 61. Because a power zoom mechanism is employed in this embodiment, the amount of drive of the zoom mechanism is input via this zooming operation ring. A lens hood 64 is extendable along the optical axis.

c. Construction of the Lens Hood

First, lens hood 64 and hood actuator HA to drive it will be explained. Hood actuator HA comprises hood drive shaft 65 that drives lens hood 64 along the optical axis, piezoelectric element 66 that works as the driving source, and guide shaft 67 that allows movement of lens hood 64 along the optical axis but prohibits rotation. One end of hood drive shaft 65 is fixed to piezoelectric element 66 which is fixed to outer shell 61. The other end is supported by tip 61a of outer shell 61 such that hood drive shaft 65 moves freely along the optical axis. Guide shaft 67 is supported by outer shell 64 at both ends.

Flange 64a, through which hood drive shaft 65 and guide shaft 67 extend, is formed at one end of lens hood 64. Hood drive shaft 65 and flange 64a are brought into contact by pressure from a spring not shown in the drawing and are connected by means of appropriate friction. Guide shaft 67 and flange 64a are also brought into contact by pressure from a spring not shown in the drawing and are connected by means of appropriate friction.

The construction of the drive portion of said hood actuator HA is identical to the construction shown in FIG. 3 referring to the first embodiment, and the drive operation via piezoelectric element 66 is also identical to that shown with reference to the first embodiment. The drive of lens hood 64 by hood actuator HA takes place in linkage with the zooming operation of the zoom lens system described below.

d. Construction of the Zoom Lens System

The construction of the zoom lens system will now be explained. The zoom lens system comprises front lens unit LF comprising a first lens unit L1 and second lens unit L2 and rear lens unit LR comprising third lens unit L3.

Fixed inner lens mount 71 fixed to outer shell 61 is located inside outer shell 61, and cam ring 72 and focus ring 73 which do not move along the optical axis but which rotate freely are located between outer shell 61 and fixed inner lens mount 71. Focus ring 73 is connected to coupler 81, which connects with a focus pin on the side of the camera main unit, by means of a drive gear mechanism not shown in the drawing, such that the rotation of the focus pin based on the focusing operation on the side of the camera main unit is transmitted to focus ring 73 via coupler 81 and focus ring 73 is caused to rotate. Cam ring 72 is constructed such that it is driven via zoom motor 87 which rotates in accordance with the drive amount set by means of the operation of zooming operation ring 63 and drive gear 88.

First lens unit L1 is supported by first lens unit holding frame 75 and second lens unit L2 comprising front lens unit LF is supported by second lens unit holding frame 76. Second lens unit holding frame 76 comprises support member 76a and lens holding frame 76b which holds lens unit L2. First lens unit holding frame 75 and support member 76a of second lens unit holding frame 76 are connected by means of helicoid screw 78.

Second lens unit holding frame 76 is equipped with lens actuator LA which slightly changes the position of second lens unit L2. This operation is described below.

e. Focusing Mechanism

The focusing mechanism will be explained. Focus ring 73 has extension 73a that extends forward (to the side of the photo object) along the optical axis, and pin 73b is located at the tip of extension 73a. Conversely, extension 75a on first lens unit holding frame 75 holds first lens unit L1 comprising front lens unit LF, which extends backward (to the side of the camera main unit) along the optical axis, said extension 75a having groove 75b formed along the optical axis and connected to pin 73b of focus ring 73.

Based on said construction, when focus ring 73 rotates, pin 73b presses groove 75b of first lens unit holding frame 75 in the direction of the circumference, whereby first lens unit holding frame 75 rotates. Because first lens unit holding frame 75 is connected with support member 76a of second lens unit holding frame 76 by means of helicoid screw 78, first lens unit holding frame 75, that is, first lens unit L1, advances or retreats along helicoid screw 78 in the direction of the optical axis, whereby the focusing operation takes place.

f. Zoom Mechanism

Figure 9:
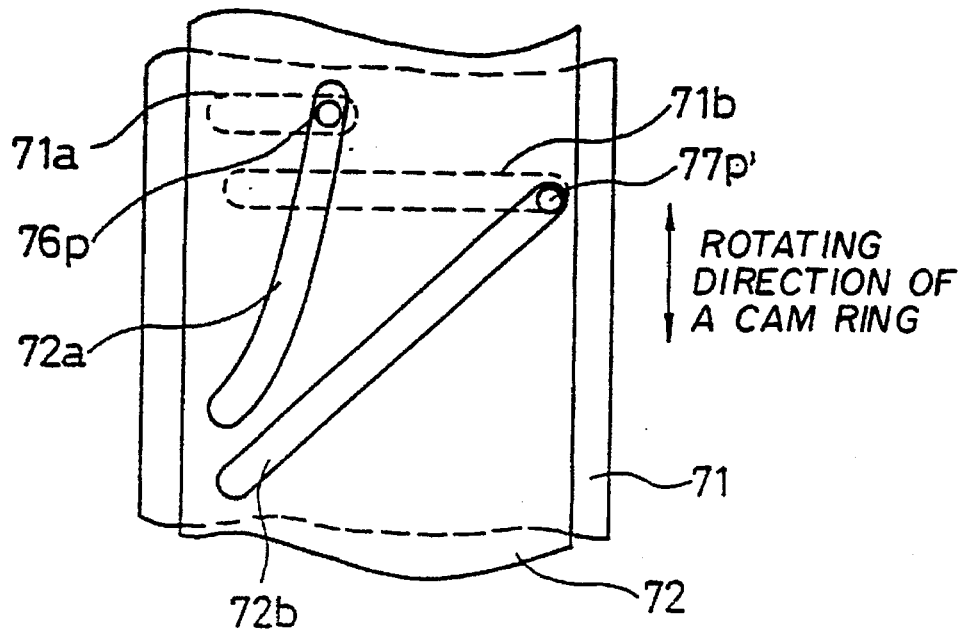
FIG. 9 is a schematic of the cam grooves of the zoom lens system shown in FIG. 8.

The zoom mechanism is explained below. FIG. 9 shows the relationship between straight advancement grooves 71a and 71b formed on fixed inner lens mount 71 and cam grooves 72a and 72b formed on cam ring 72 of the zoom lens system shown in FIG. 8. FIG. 9 is drawn by developing cylindrical fixed inner lens mount 71 and cam ring 72 into a flat plane. Cam ring 72 rotates via the operation of zooming operation ring 63 and the zooming operation in which front lens unit LF and rear lens unit LR move along the optical axis takes place as explained below.

Straight advancement grooves 71a and 71b are formed on fixed inner lens mount 71 while cam grooves 72a and 72b are formed on cam ring 72. Since pin 76b located on second lens unit holding frame 76 extends through straight advancement groove 71a and cam groove 72a, it moves second lens unit holding frame 76 along the optical axis in response to the rotation of cam ring 72. When this happens, because first lens unit holding frame 75 that is connected with second lens unit holding frame 76 by means of helicoid screw 78 also moves, front lens unit LF moves along the optical axis in response to the rotation of cam ring 72.

Further, since pin 77p located on third lens unit holding frame 77 extends through straight advancement groove 71b and cam groove 72b, it moves third lens unit holding frame 77 along the optical axis in response to the rotation of cam ring 72. In other words, rear lens unit LR moves along the optical axis in response to the rotation of cam ring 72.

Second lens unit holding frame 76 has lens actuator LA that slightly changes the position of second lens unit L2. This actuator is used for the purpose of moving second lens unit L2 slightly in order to correct an out-of-focus condition during the zooming operation.

g. Lens Actuator

Figure 10:
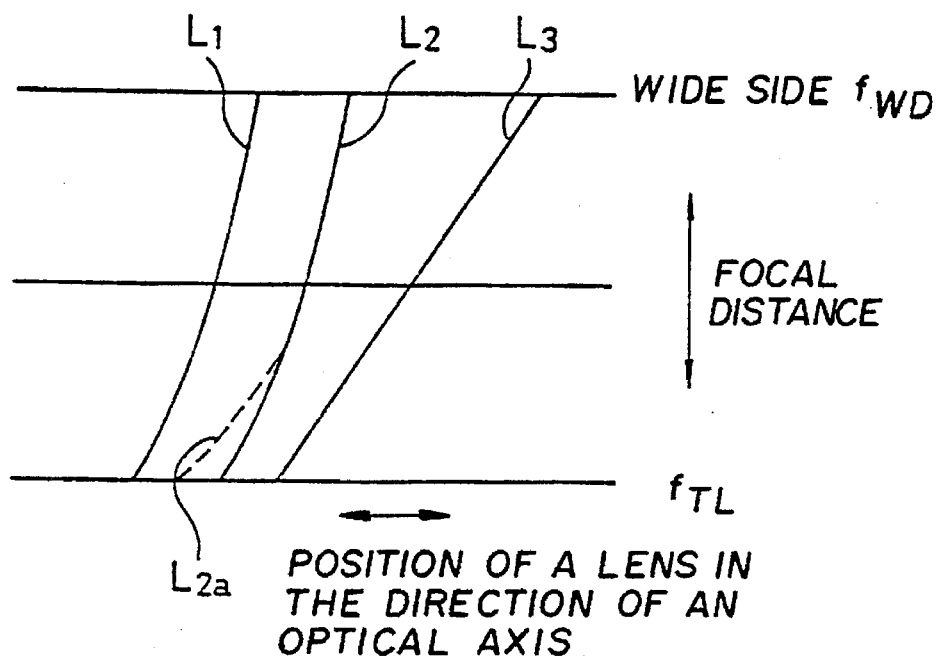
FIG. 10 is a schematic of the loci of movement of lens units of the zoom lens system shown in FIG. 8.

As explained with reference to FIG. 9, front lens unit LF and rear lens unit LR move by means of straight advancement grooves 71a and 71b formed on fixed inner lens mount 71 and cam grooves 72a and 72b formed on cam ring 72. First lens unit L1 and second lens unit L2 comprising front lens unit LF and third lens unit L3 comprising rear lens unit LR draw loci as shown in FIG. 10 while first lens unit L1 and second lens unit L2 move as one unit. However, because blurriness occurs when the focal length is close to the longest available if first lens unit L1 and second lens unit L2 are moved as one unit, it is necessary to make the locus of second lens unit L2 come slightly closer to that of first lens unit L1 as shown by L2a in order to correct said condition.

In order to attain such a movement, because it is difficult to have separate cams for first lens unit L1 and second lens unit L2 in the limited space inside the lens mount, the present invention employs a lens actuator explained below.

The construction of lens actuator LA will be explained with reference to FIG. 8. Support member 76a for second lens unit L2 has drive shaft 76c which drives lens holding frame 76b along the optical axis and guide groove 76d which allows the movement of lens holding frame 76b along the optical axis but which prohibits its rotation. One end of drive shaft 76c is glued and fixed to one end of piezoelectric element 76e, the other end of which is glued and fixed to support member 76a, and the other end of drive shaft 76c is supported by tip 76f of support member 76a such that drive shaft 76c may move along the optical axis.

Drive shaft 76c extends through lens holding frame 76b. Lens holding frame 76b and drive shaft 76c are brought into contact by pressure from a spring not shown in the drawing and are connected by means of appropriate friction. Lens holding frame 76b also has protrusion 76g that is engaged with guide groove 76d. The correction of an out-of-focus condition during the zooming operation of the zoom lens system is performed by a control circuit explained below.

h. Control of the Zoom Lens System

Figure 11:
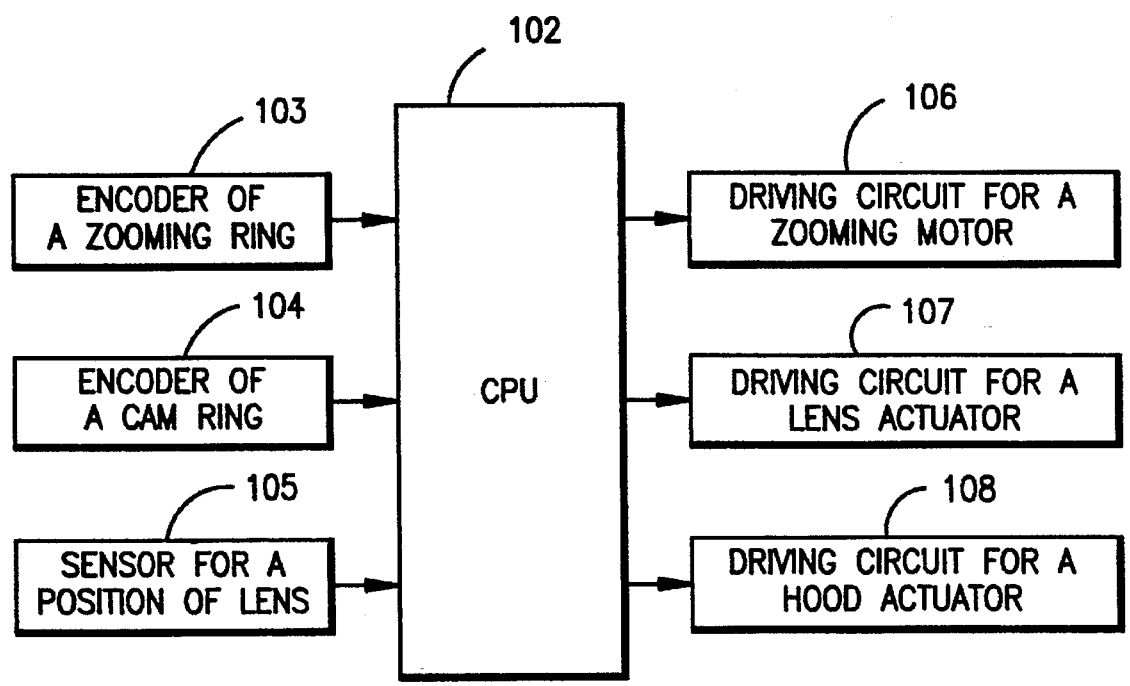
FIG. 11 is a block diagram of a control circuit of the zoom lens system shown in FIG. 8.

The control of the zoom lens system will now be explained. FIG. 11 is a block diagram of the zoom lens system control circuit. The control circuit comprises CPU 102, zooming operation ring encoder 103 that detects the angle of rotation of zooming operation ring 63, cam ring encoder 104 that detects the angle of rotation of cam ring 72, and lens position sensor 105 that detects the position of lens holding frame 76b relative to support member 76a in second lens unit holding frame 76, said encoders and sensor being connected to input ports of CPU 102, as well as zoom motor drive circuit 106, lens actuator drive circuit 107 and hood actuator drive circuit 108, said circuits being connected to output ports of CPU 102.

While the constructions of these encoders and sensors and their locations in the lens system are not shown in the drawings, public domain encoders and sensors may be used, and they can also be arranged in appropriate locations.

Figure 12:
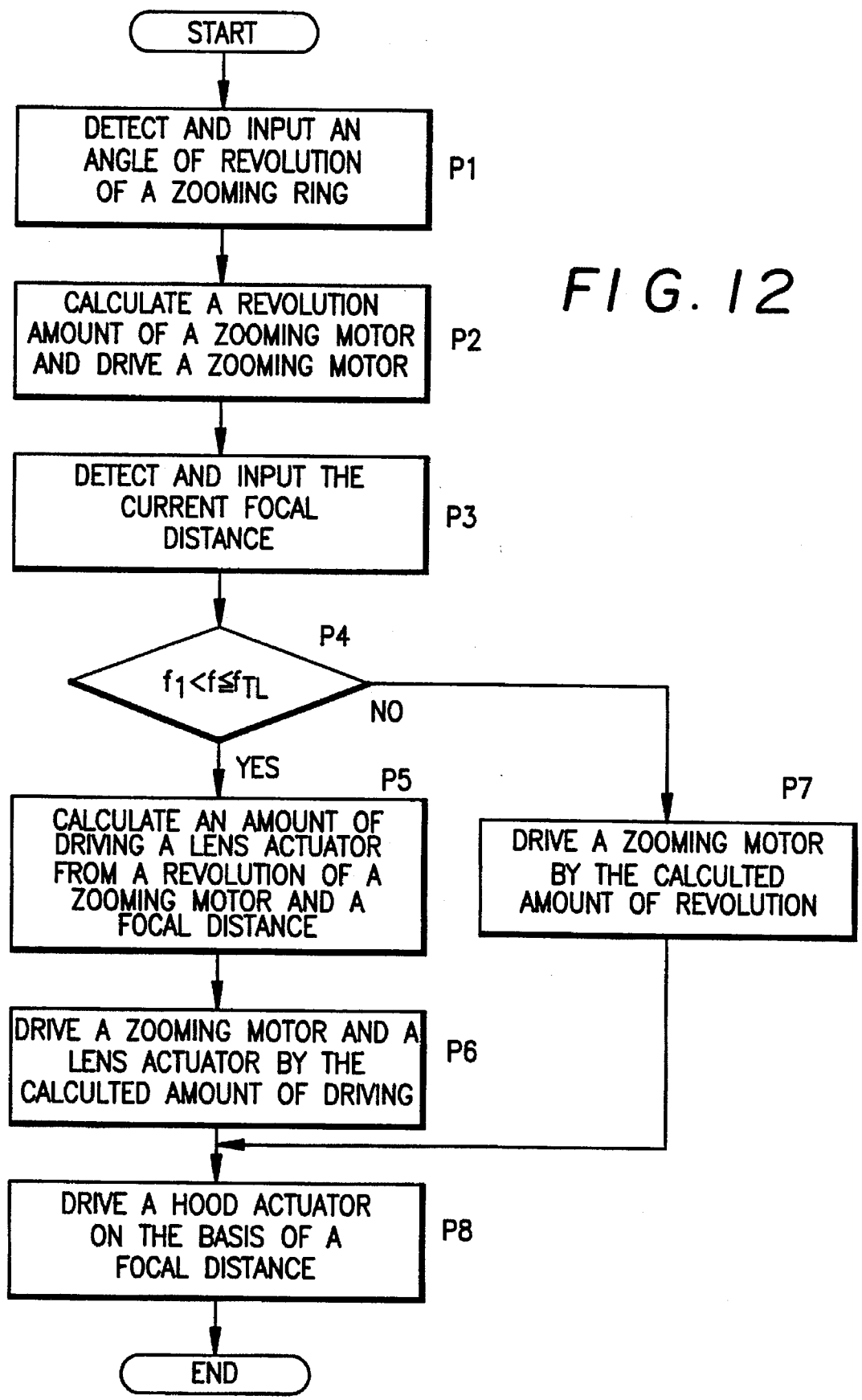
FIG. 12 is a flow chart to explain the control operation executed in the control circuit of the zoom lens system shown in FIG. 11.

FIG. 12 is a flow chart to explain the zoom lens system control operation carried out in zoom lens system control circuit CPU 102 shown in FIG. 11. When the control operation is initiated, the angle of rotation of zooming operation ring 63 detected by zooming operation ring encoder 103 is first input (step P1), after which the amount of rotation of zoom motor 87 is calculated in accordance with the angle of rotation of zooming operation ring 63, and zoom motor 87 is driven (step P2).

Because cam ring encoder 104 detects the angle of rotation of cam ring 72 at all times, the current zoom position, or in other words focal length f, is obtained based on the angle of rotation of cam ring 72 (step P3) and it is determined whether or not focal length f is between the longest focal length fTL available for the lens system and prescribed focal length fl (step P4).

If it is determined in step P4 that focal length f is between longest focal length fTL and prescribed focal length fl, the amount of drive for lens actuator LA is calculated based on the amount of rotation of zoom motor 87 and focal length f (step P5), and the zoom motor and lens actuator LA are driven by the calculated drive amount (step P6), whereby zooming takes place such that first lens unit L1, second lens unit L2 and third lens unit L3 move along the loci shown in FIG. 10. The driving of second lens unit L2 by lens actuator LA may be achieved either by saving amounts of drive corresponding to various focal lengths f in the ROM in advance and reading the amount of drive corresponding to the current focal length f based on said focal length f, or by having the amount of drive calculated as a function of focal length f.

If it is determined in step P4 that focal length f is not between longest focal length fTL and prescribed focal length fl (if it is between shortest focal length fWD and prescribed focal length fl), the standard zooming is performed via driving zoom motor 87, in which first lens unit L1 and second lens unit L2 are moved as one unit (step P7).

Then, based on focal length f obtained from the angle of rotation of cam ring 72 detected in step P3, hood actuator HA is driven so that the lens hood is set at a position suitable for focal length f (step PS), whereby the zooming operation is terminated.

Third Embodiment

A third embodiment of the present invention will now be explained. The third embodiment is constructed such that in the movement of the lens units during the zooming operation, the movement of second lens unit L2 and third lens unit L3 is achieved using cam rings, while the movement of first lens unit L1 relative to second lens unit L2 is realized using lens actuator LA. In addition, the focusing operation is performed by moving first lens unit L1 relative to second lens unit L2 by means of lens actuator LA.

Figure 13:
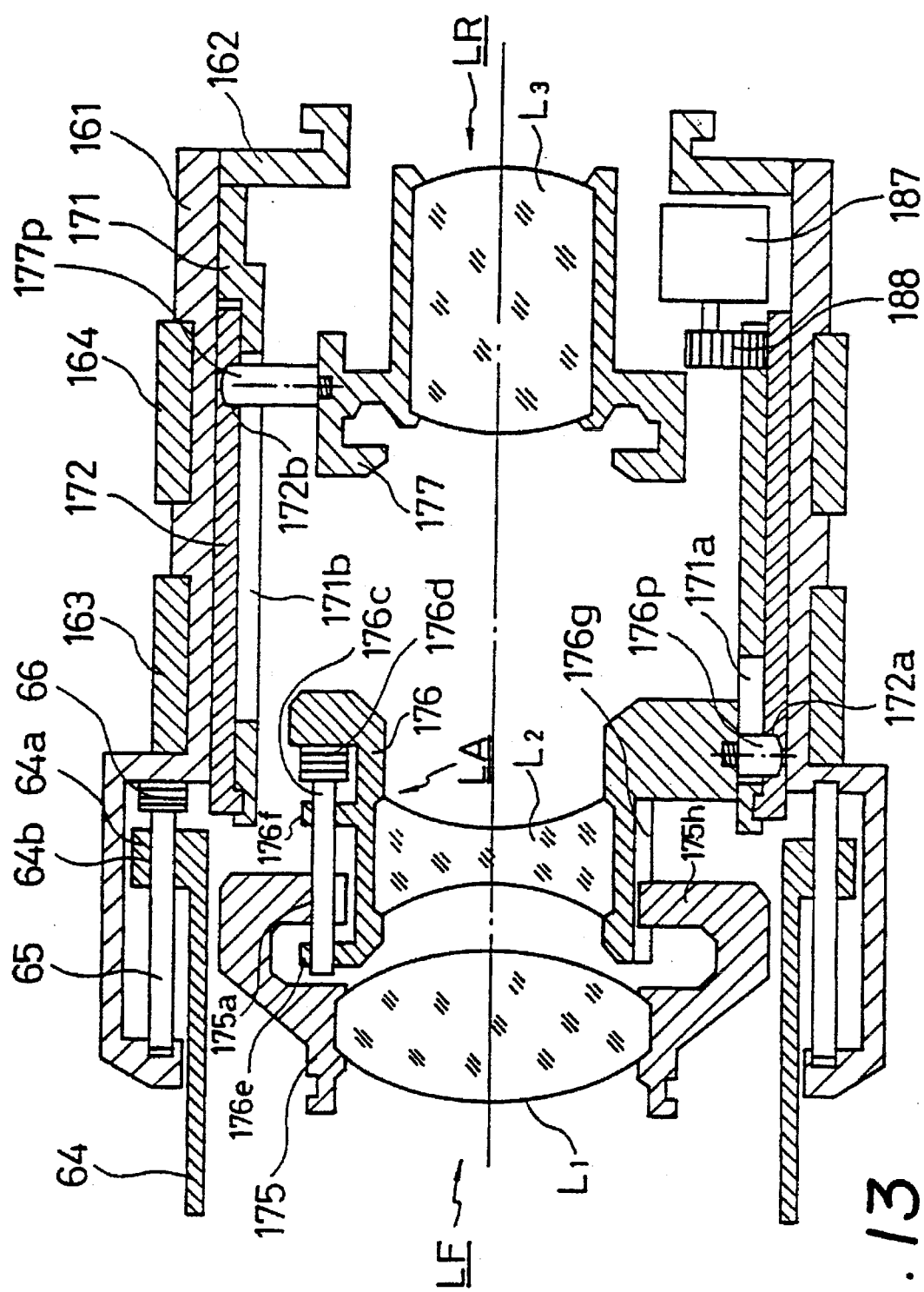
FIG. 13 is a cross-sectional view showing the construction of a zoom lens system of a third embodiment in which the present invention is applied.

FIG. 13 shows a cross-sectional view of a zoom lens system of the third embodiment. This system includes an outer shell 161 of the zoom lens system, a mounting unit 162 by which the zoom lens system is mounted to the camera, and a zooming operation ring 163 that rotates over outer shell 161. Since the power zoom mechanism is used in this embodiment, the zooming operation ring 163 inputs the amount of drive for the zoom mechanism. A power focus (PF) operation switch 164 described below and a lens hood 64 extendable along the optical axis are illustrated.

Lens hood 64 and hood actuator HA to drive it have the same constructions as those in the second embodiment. Therefore, identical numbers are used to indicate the same members as in the second embodiment and the explanations thereof are omitted here.

The driving of lens hood 64 by means of hood actuator HA takes place in tandem with the zooming operation of the zoom lens system.

The construction of the zoom lens system will now be explained. The zoom lens system comprises front lens unit LF comprising first lens unit L1 and second lens unit L2 and rear lens unit LR comprising third lens unit L3. First lens unit L1 comprising front lens unit LF is held by first lens unit holding frame 175 while second lens unit L2 of front lens unit LF is held by second lens unit holding frame 176.

The zoom mechanism is explained below. Fixed inner lens mount 171 fixed to outer shell 161 is located in outer shell 161, and cam ring 172 that does not move along the optical axis but that freely rotates is located between outer shell 161 and fixed inner lens mount 171. Cam ring 172 is constructed such that it rotates by means of zoom motor 187 and drive gear mechanism 188.

Straight advancement grooves 171a and 171b are formed on fixed inner lens mount 171 while cam grooves 172a and 172b are formed on cam ring 172. The relationship between the straight advancement grooves and the cam grooves is the same as that used in the second embodiment shown in FIG. 9.

Pin 176p located on second lens unit holding frame 176 extends through straight advancement groove 171a and cam groove 172a, and thus it moves second lens unit holding frame 176 (which holds second lens unit L2) along the optical axis in response to the rotation of cam ring 172.

Pin 177p located on third lens unit holding frame 177 extends through straight advancement groove 171b and cam ring 172b, and thus it moves third lens unit holding frame 177 (which holds third lens unit L3) along the optical axis in response to the rotation of cam ring 172.

Lens actuator LA located between first lens unit holding frame 175 and second lens unit holding frame 176 moves first lens unit L1 relative to second lens unit L2 along the optical axis.

The construction of lens actuator LA will now be explained. Second lens unit holding frame 176 has drive shaft 176c which drives first lens unit holding frame 175 along the optical axis and guide groove 176g, which allows the movement of first lens unit holding frame 175 along the optical axis but prohibits its rotation. While drive shaft 176c is supported by support members 176e and 176f of second lens unit holding frame 176 such that it moves freely along the optical axis, one of its ends is fixed to one end of piezoelectric element 176d, the other end of which is fixed to second lens unit holding frame 176.

Friction engagement unit 175a extending from first lens unit holding frame 175 extends through drive shaft 176c. Friction engagement unit 175a and drive shaft 176c are brought into contact by pressure from a spring, or similar means not shown in the drawing, and are made to engage with each other by means of appropriate friction. Member 175h extending from first lens unit holding frame 175 engages with guide groove 176g.

As described above, the construction of lens actuator LA is the same as in the first and second embodiments, and the drive operation by means of piezoelectric element 176d is the same as in the first and second embodiments. Therefore, detailed explanations thereof are omitted.

Focus adjustment of the lens system is performed as follows. The lens actuator drive amount is calculated in a control circuit not shown in the drawing based on a defocus signal output from an automatic focus adjustment mechanism (AF mechanism) not shown in the drawing. Based on the thus calculated drive amount, lens actuator LA is driven, whereby first lens unit holding frame 175 holding first lens unit L1 is moved relative to second lens unit holding frame 176 holding second lens unit L2.

In this embodiment, manual focusing is performed using a power focus (PF) operation in which actuator LA is used. When PF switch 164 is rotated, information such as the amount and direction of rotation is input to the control circuit by means of public domain encoders not shown in the drawing and the lens actuator is driven.

In the zooming operation, the amount of rotation of zoom motor 187 is calculated in the control circuit not shown in the drawing based on the angle of rotation of zooming operation ring 163 detected by an encoder not shown in the drawing, and zoom motor 187 is driven. The angle of rotation of cam ring 172 is detected by an encoder not shown in the drawing, such that set focal length f may be sought.

When it is determined necessary to correct the position of second lens unit L2 relative to first lens unit L1 based on set focal length f, lens actuator LA is operated so that the position of second lens unit L2 relative to first lens unit L1 is corrected.

Using this construction, complex components such as the coupler that combines with the focus pin on the side of the camera main unit, the focus ring and the helicoid screw formed between the first lens unit holding frame holding first lens unit L1 and the holding frame holding second lens unit L2 may be omitted, and therefore, an eccentric error between the first and second lens units based on a manufacturing error in connection with the helicoid screw may be avoided.

The piezoelectric element is one type of electromechanical transducer. As electro-mechanical transducers, electrostrictive elements, magnetostrictors, etc. are also available. Magnetostrictors do not take in electric energy directly, but an electric action takes place inside the element through magnetic action, as a result of which a mechanical action is provided.

An optical-strictive element, in which a mechanical action is caused by light inside the element, is also included among the transducers that may be used in the present invention.

As described above, using the present invention, because the drive means for movable members comprising the lens system, such as the collapsible lens mount and lens hood, as well as optical elements like the lens units comprising the zoom lens system, are constructed using electromechanical transducers, the lens system, which was previously large because of the use of conventional complex cam mechanisms, can be made small. Moreover, minute changes in position, which were difficult to achieve using a cam mechanism, can now easily be attained. In addition, because positioning of optical elements, etc. is performed electrically, precise control becomes easy. Thus, a superior lens system drive means not present in conventional models can be provided.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A lens driving apparatus, comprising:

a first lens support for supporting a lens;

a second lens support for supporting the first lens support;

a third lens support for supporting the second lens support for relative movement therebetween;

a driving member movably mounted in said third lens support;

a transducer mounted in said third support and coupled to said driving member for producing displacement of said driving member in a predetermined direction responsive to impressed driving pulses; and a coupling member fixed to said second lens support and coupled to said driving member to transmit displacement of the driving member to the second lens support.

2. The lens driving apparatus as claimed in claim 1, wherein the second lens support is movable between a position housed within the third lens support and a position extending from the third lens support.

3. The lens driving apparatus as claimed in claim 1, further comprising:

means for providing friction between said driving member and said coupling member.

4. The lens driving apparatus as claimed in claim 1, wherein the first lens support is movably supported in the second lens support, and further comprising:

a second driving member movably mounted in said second lens support;

a second transducer mounted in said second support and coupled to said second driving member for producing displacement of said second driving member in a predetermined direction responsive to impressed driving pulses; and a second coupling member fixed to said first lens support and coupled to said second driving member to transmit displacement of said second driving member to the first lens support.

5. The lens support apparatus as claimed in claim 4, further comprising:

a fourth lens support to support the third lens support for relative movement therebetween;

a third driving member movably mounted in said fourth lens support;

a third transducer mounted in said fourth support and coupled to said third driving member for producing displacement of said third driving member in a predetermined direction responsive to impressed driving pulses; and a third coupling member fixed to said third lens support and coupled to said third driving member to transmit displacement of said third driving member to the third lens support.

6. A lens device comprising:

a support member;

a driving member movably mounted in said support member;

a transducer mounted in said support member and coupled to said driving member for producing displacement of said driving member in response to impressed driving impulses;

a coupling member engaged with the driving member for transmitting movement of the driving member; and a lens hood fixed to the coupling member for movement therewith, for preventing unwanted light from entering a lens housed in said support member.

7. A lens device according to claim 6, wherein the coupling member is frictionally engaged with the driving member.

8. A lens driving apparatus, comprising:

a first lens support for supporting a lens;

a second lens support for supporting the first lens support for relative movement therebetween;

a driving member movably mounted in said second lens support;

a transducer mounted in said second lens support and coupled to said driving member for producing displacement of said driving member in a predetermined direction responsive to impressed driving pulses; and a coupling member fixed to said first lens support and coupled to said driving member to transmit displacement of the driving member to the first lens support.

9. The lens driving apparatus as claimed in claim 8, wherein the first lens support is movable between a position housed within the second lens support and a position extending from the second lens support.

10. The lens driving apparatus as claimed in claim 8, further comprising means for providing friction between said driving member and coupling member.

* * * * *